United States Patent [19]
Takayama et al.

[11] Patent Number: 6,126,774
[45] Date of Patent: Oct. 3, 2000

[54] PLASTIC PRODUCT AND MANUFACTURING METHOD THEREFOR

[75] Inventors: Hirokazu Takayama, Tokyo; Toshiyuki Ogawa, Kanagawa-ken, both of Japan

[73] Assignee: Ebara Corporation, Tokyo, Japan

[21] Appl. No.: 08/924,698

[22] Filed: Sep. 5, 1997

Related U.S. Application Data

[62] Division of application No. 08/694,937, Aug. 9, 1996, Pat. No. 5,989,664.

[30] Foreign Application Priority Data

Aug. 11, 1995 [JP] Japan .................................. 7-227512

[51] Int. Cl.$^7$ .................................................. B32B 31/00
[52] U.S. Cl. ........................................... 156/285; 156/295
[58] Field of Search ................................. 156/285, 286, 156/245, 295, 58; 264/401; 430/269, 320

[56] References Cited

U.S. PATENT DOCUMENTS

| | | | |
|---|---|---|---|
| 4,575,330 | 3/1986 | Hull | 425/174.4 |
| 4,870,827 | 10/1989 | McFarlin et al. | 417/DIG. 1 X |
| 5,041,260 | 8/1991 | Johnson et al. | 264/510 |
| 5,094,935 | 3/1992 | Vassiliou et al. | 430/320 |
| 5,131,818 | 7/1992 | Wittkop et al. | 417/DIG. 1 X |
| 5,266,249 | 11/1993 | Grimes, III et al. | 264/45.2 |
| 5,591,404 | 1/1997 | Matheswon | 422/48 |

OTHER PUBLICATIONS

"Engineered Plastics For Improved Pump Performance," E. G. Margus. American Institute of Chemical Engineers, 1982. Spring Conference; Anaheim, California.

*Primary Examiner*—Francis J Lorin
*Attorney, Agent, or Firm*—Oblon, Spivak, McClelland, Maier & Neustadt, P.C.

[57] ABSTRACT

A plastic product comprising an inner core portion made of plastic and having a solid shape or a hollow shape including an internal cavity, and a fiber-reinforced plastic layer formed on inner and/or outer surfaces of the inner core portion, whereby the plastic product has light weight, high strength and excellent vibration suppressing and noise shielding ability.

9 Claims, 5 Drawing Sheets

PLASTIC PRODUCT AND MANUFACTURING METHOD THEREFOR

This is a Division, of application Ser. No. 08/694,937 filed on Aug. 9, 1996, now U.S. Pat. No. 5,989,664.

BACKGROUND OF THE INVENTION

1. Field of the Art

The present invention relates to a plastic product such as a pump casing used in a high speed/high pressure rotary machine, and a method for manufacturing such a plastic product.

2. Prior Art

Since a high pressure rotary machine of this kind normally generates a great amount of vibration and noise, it is necessary for parts of the rotary machine such as a casing and an impeller to have vibration preventing properties and noise attenuation properties. Conventionally, in order to prevent or attenuate vibration and noise, machine parts have been formed from vibration suppressing materials and/or noise shielding materials. However, the volume of such part tends to become bulky, and, it is therefore, difficult to produce a part having a complicated configuration due to the poor workability of materials used. Further, since frequencies for attenuating vibration and noise differ from material to material, it is difficult to set an attenuating frequency for a part.

Further, the fiber-reinforced plastic (in which glass fibers or carbon fibers are mixed with plastic) is often used to form parts of a high pressure rotary machine from a plastic material. In this case, if the part has a complicated shape, since a structure of a die for manufacturing the part also becomes complicated, it is very difficult to form the complicated part from the plastic material.

The present invention was made to overcome the above-mentioned conventional drawbacks, and has as an object the provision of a plastic product which is light-weight, strong and has excellent vibration suppressing and noise shielding characteristics, and a method for manufacturing such a plastic product, in which a complicated shape can be easily obtained.

SUMMARY OF THE INVENTION

To achieve the above object, according to the first aspect of the present invention, there is provided a plastic product comprising an inner core made of a plastic material and having a solid or hollow configuration including an internal cavity, and a fiber-reinforced plastic layer formed on an inner surface and/or an outer surface of the core.

Further, according to a second aspect of the invention, in a plastic product of the first aspect, the fiber-reinforced plastic layer is formed from a fiber-reinforced prepreg.

According to a third aspect of the invention, there is provided a method for manufacturing a plastic product which comprises steps of forming an inner core of a solid shape or a hollow shape having an internal cavity, by a photo-forming technique, i.e., laser stereo lithography or selective laser sintering, adhering a fiber-reinforced prepreg onto an inner surface and/or an outer surface of the core, closely contact the fiber-reinforced prepreg with the inner core by means of a vacuum pack technique, and curing the fiber-reinforced prepreg.

In the plastic part of the present invention described above, since the fiber-reinforced plastic layer is formed on the inner and/or outer surfaces of the inner core, by changing the thickness of the inner core and/or the fiber-reinforced plastic layer, a coincidence frequency can be set appropriately. Thus, vibration and noise can be attenuated at a desired frequency, and a plastic product having a desired strength and elastic modules which are greater than those in the conventional product can be provided. The coincidence frequency in a frequency in which a sound transmission loss is reduced by the coincidence effect.

By using a fiber-reinforced plastic having an elastic modules which is higher than that of the inner core as the fiber-reinforced plastic layer, a load acting on the inner core formed from low elastic modules resin can be reduced since a substantial portion of the load is supported by the fiber-reinforced plastic layer or layers.

Further, according to the manufacturing method of the present invention, the inner core is formed from a resin material by a photo-forming technique, the fiber-reinforced prepreg is adhered to the inner and/or outer surfaces of the inner core, the fiber-reinforced prepreg is closely contacted with the inner core by a vacuum packing technique, and then the resin is cured. Thus, a plastic product having a complicated three dimensional structure with the above advantages can be obtained.

The above and other objects, features and advantages of the present invention will become more apparent from the following description when taken in conjunction with the accompanying drawings in which preferred embodiments of the present invention are shown by way of illustrative examples.

PREFERRED EMBODIMENTS OF THE INVENTION

The present invention will now be explained in connection with an embodiment thereof with reference to the accompanying drawings. In the illustrated embodiment, a casing of a volute pump is exemplified as a plastic product, and such a casing and manufacturing method therefor will be explained.

Figure 1:
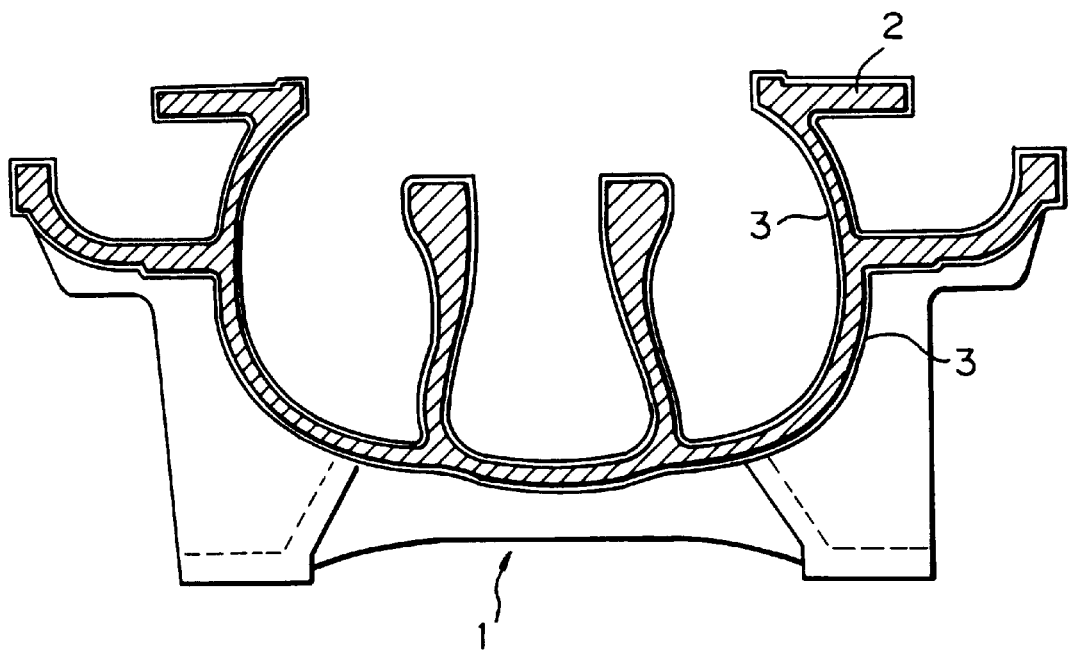
FIG. 1 is a sectional view showing a structure of a lower casing of a volute pump manufactured by a manufacturing method according to the present invention.

FIG. 1 is a sectional view showing a lower casing of the volute pump. As shown, the lower casing 1 comprises an inner core portion 2 made of a plastic material, and a fiber-reinforced plastic layer 3 formed on inner and outer surfaces of the inner core portion 2. As will be descried later, the fiber-reinforced plastic layer 3 is formed from a prepreg material, i.e., laminated molded material in which thermosetting resin is impregnated into a continuous reinforce member such as a mat formed from reinforce fibers such as carbon fiber and glass fibers.

As mentioned above, by closely contacting and adhering the fiber-reinforced plastic layer 3 onto the inner and outer surfaces of the inner core portion 2, the pressure acting on the inner and outer surfaces of the lower casing 1 of the volute pump is supported by the outer and inner fiber-reinforced plastic layer 3, and vibration is absorbed by the resin of the inner core portion 2. As a result, vibration and noise emanating from the lower casing 1 of the volute pump can be properly suppressed.

Figure 2:
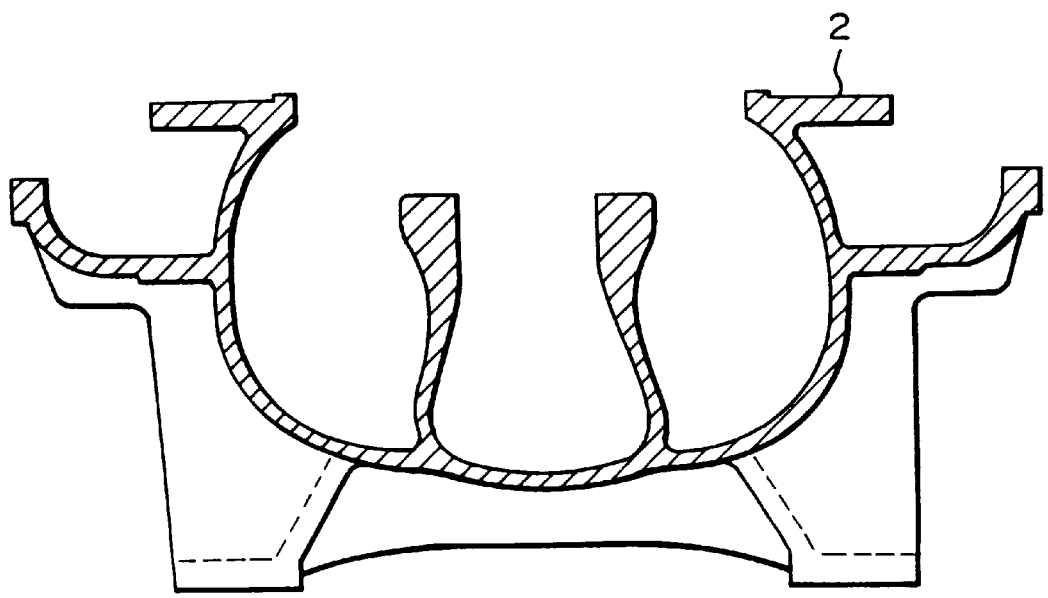
FIG. 2 is a sectional view showing the structure of the inner core portion of the lower casing of the volute pump of FIG. 1.
Figure 3:
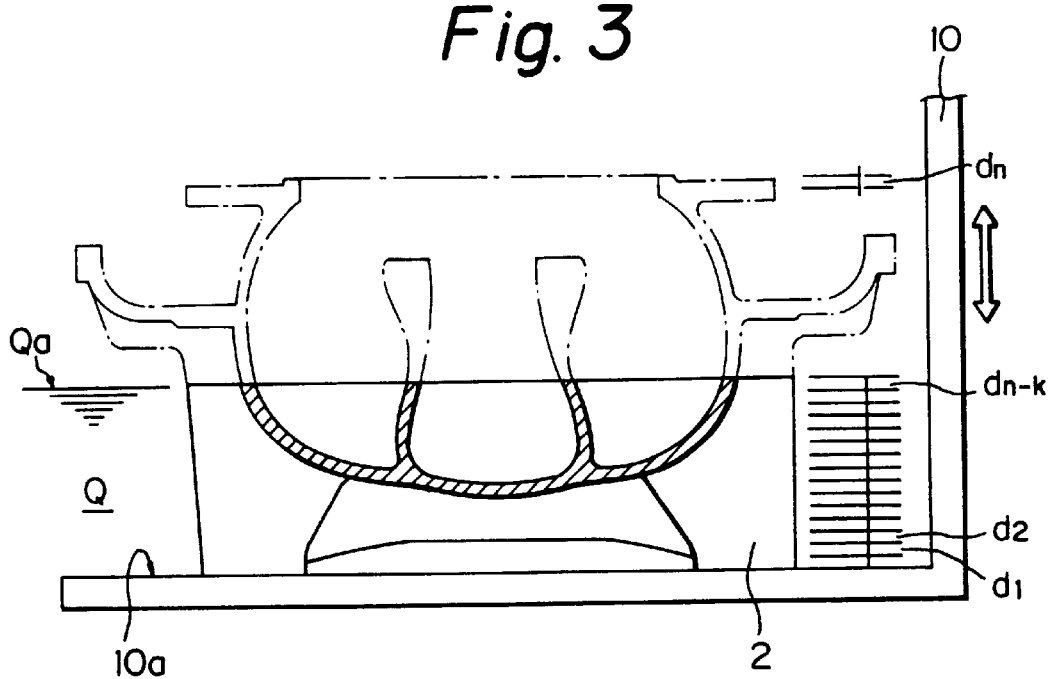
FIG. 3 is a view outlining a photo-forming method.

Next, a method for manufacturing the lower casing 1 of the volute pump will be explained. FIG. 2 is a sectional view of the inner core portion of the lower casing. The inner core portion 2 is formed from urethane resin by a well-known photo-forming technique. FIG. 3 schematically shows the photo-forming technique. As shown, an elevator 10 for a lifting/lowering movement is disposed within a container, which includes a liquid-form resin Q which can be cured by being irradiated with light such as ultraviolet light having a predetermined wavelength. Further, contourline data of an inner core model in which the model is sliced into a plurality of thin layers or plates (each having a thickness of "d") is designed as CAD data and stored in a control portion (not shown).

First of all, under the control of the control portion, the elevator 10 is held so that an upper surface 10a of the elevator is positioned below a liquid surface Qa of the liquid-form resin by a distance d (corresponding to the thickness of one sliced plate), and the liquid-form resin is cured by being irradiated with light such as ultra-violet light having a predetermined wavelength to form a sliced resin plate (having the thickness of d). Then, the elevator 10 is lowered by a distance d and then the liquid-form resin Q is cured. By repeating such operations, a laminated layer structure of sliced resin plates ($d_1, d_2, \ldots, d_{n-k}, \ldots, d_n$) is formed. In this way, a three dimensional inner core portion 2 is manufactured. A complicated three dimensional part can be easily manufactured by using such photo-forming technique.

Figure 4:
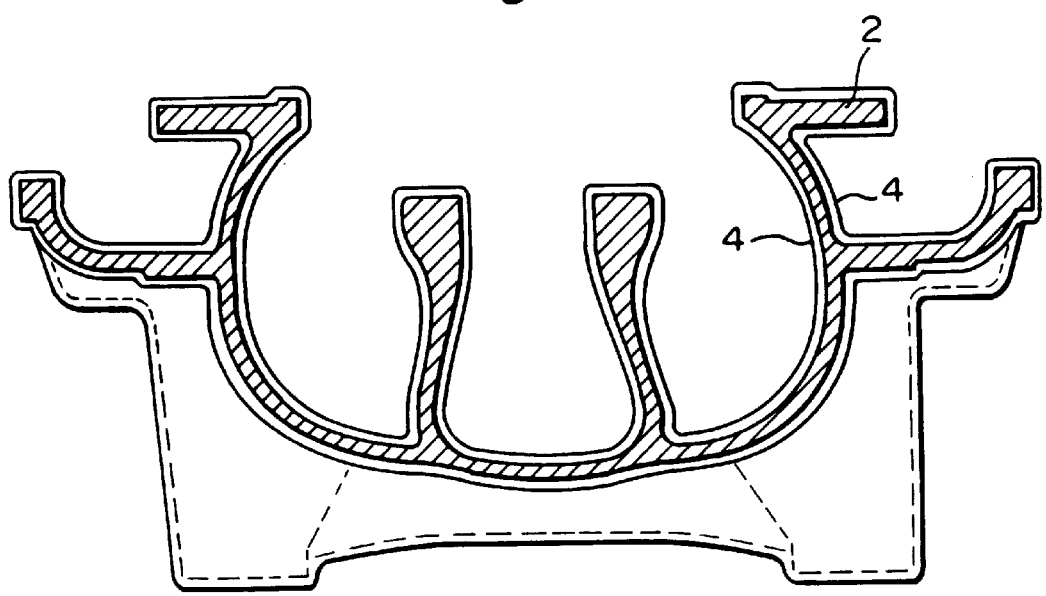
FIG. 4 is a view showing one step of manufacturing the lower casing of the volute pump of FIG. 1.

Next, as shown in FIG. 4, a prepreg layer 4 is adhered to inner and outer surfaces of the inner core portion 2 having the shape shown in FIG. 2. As an example, the prepreg 4 is formed by impregnating epoxy resin into a mat-shaped reinforce member made of carbon fibers. Incidentally, the prepreg 4 is not limited to such an example, but may be formed by impregnating a thermosetting resin such as polyester resin into a glass fiber mat and by maintaining them in a gel form so as to prevent adhesion to each other.

Figure 5:
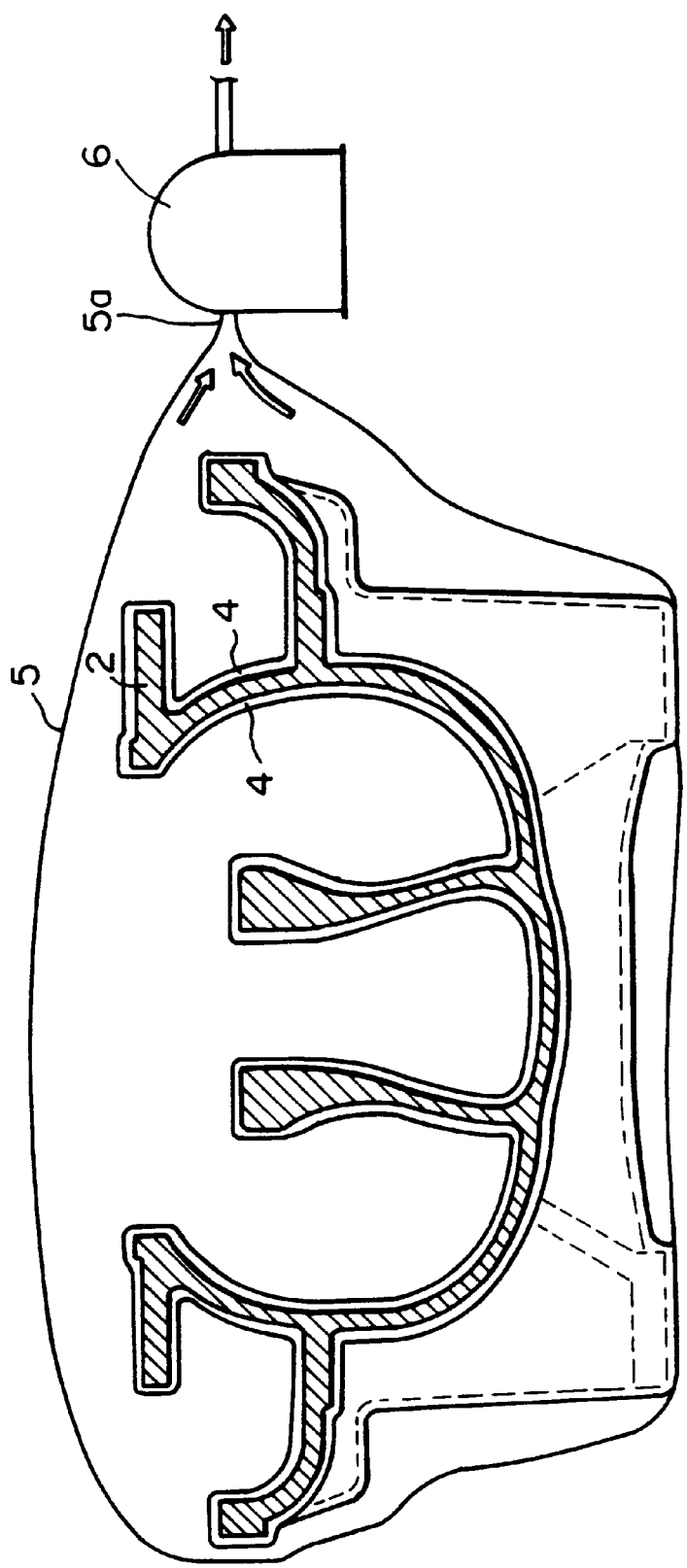
FIG. 5 is a view showing another step of manufacturing the lower casing of the volute pump of FIG. 1.
Figure 6:
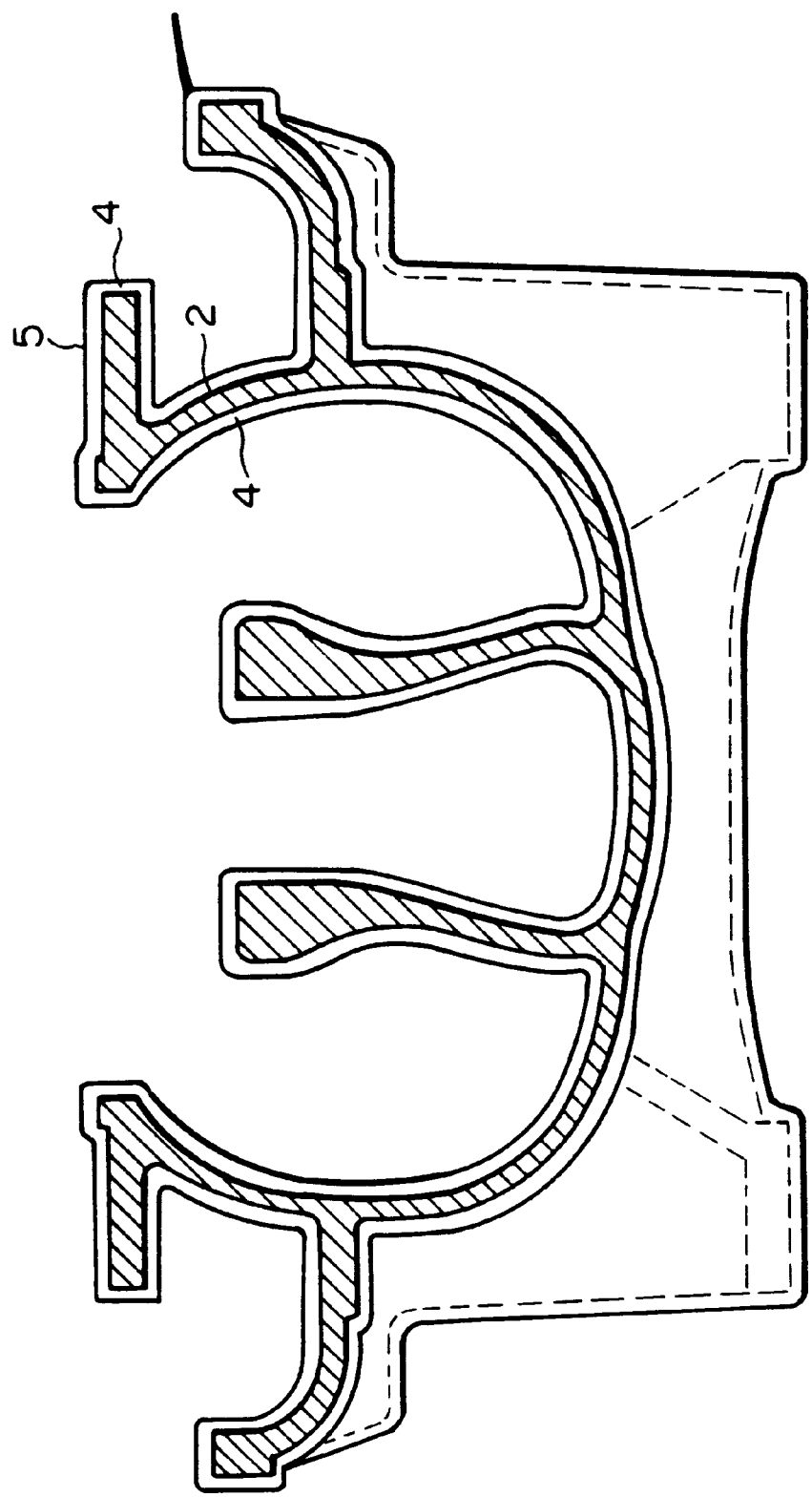
FIG. 6 is a view showing a further step of manufacturing the lower casing of the volute pump of FIG. 1.

Further, as shown in FIG. 5, the inner core portion 2 having the prepreg layer 4 on the inner and outer surfaces, which was adhered as mentioned above, is contained within a polyethylene bag 5, and a mouth 5a of the bag is connected to a suction port of a vacuum pump 6. Then, by driving the vacuum pump 6 to decrease pressure in the polyethylene bag 5, the polyethylene bag 5 is closely contacted with the prepreg 4 as shown in FIG. 6, thereby closely contacting the prepreg 4 with the inner core portion 2. That is to say, the inner core portion 2 and the prepreg 4 adhered to the inner and outer surfaces thereof are vacuum-packed in the polyethylene bag 5.

Then, the inner core portion 2 vacuum-packed in the polyethylene bag 5 as mentioned above is inserted into a furnace (not shown) and heated to a predetermined temperature for curing the thermosetting resin (epoxy resin, in the illustrated embodiment) of the prepreg 4. Consequently, the thermosetting resin is cured, with the result that the prepreg layer 4 forms the fiber-reinforced plastic layer 3 shown in FIG. 1.

In this way, the lower casing 1 of the volute pump is manufactured. By changing the thicknesses of the inner core portion 2 and/or the fiber-reinforced plastic layer 3 adhered to the inner and outer surfaces thereof, a coincidence frequency can be set appropriately, and, thus, vibration and noise can be attenuated at the expected frequency. Further, by using the fiber-reinforced plastic having an elastic modules higher than that of the inner core portion 2 as the fiber-reinforced plastic layer 3, a load acting on the inner core portion 2 formed from low elastic modules resin can be reduced. In addition, although not illustrated an upper casing of the volute pump can be manufactured in the same manner as the lower casing.

Incidentally, in the illustrated embodiment, while an example in which the fiber-reinforced plastic layer 3 is formed on the inner and outer surfaces of the inner core portion 2 was explained, a fiber reinforced plastic layer 3 may be formed on either an inner surface or an outer surface of the part depending on the pressure and vibration acting on the part.

Figure 7:
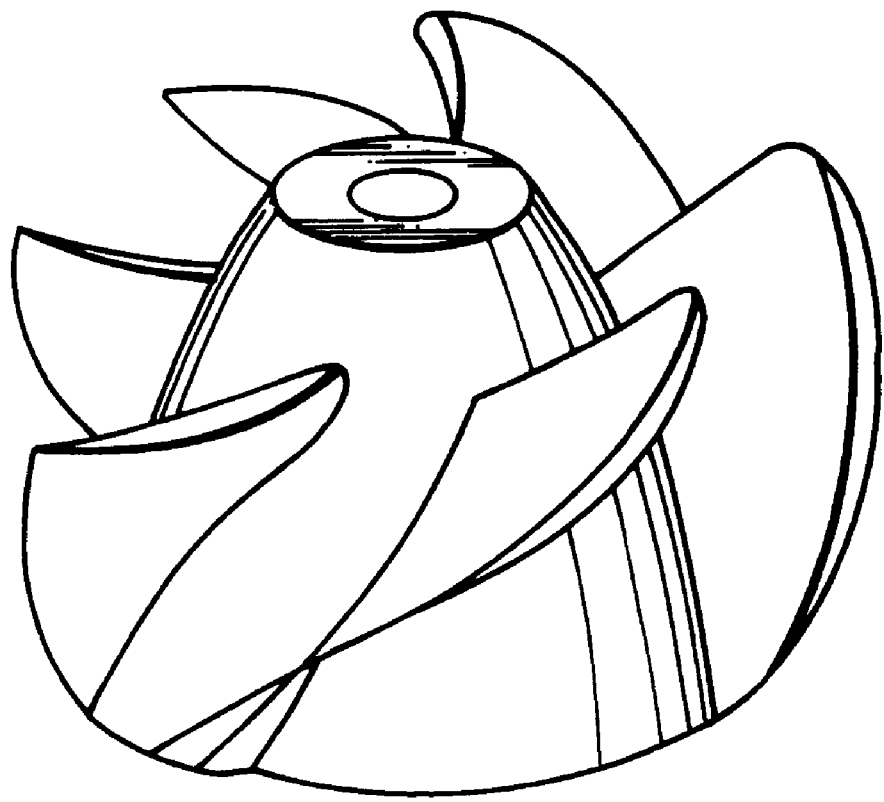
FIG. 7 is a perspective view showing a structure of a pump impeller manufactured by the manufacturing method according to the present invention.

Further, in the illustrated embodiment, while an example of the structure and the manufacturing method for the casing of the volute pump was explained, the present invention is not limited thereto as an example of a pressure resistance part, but may be applied to any rotary part. For example, as is in a pump impeller shown in FIG. 7, a rotary member having three dimensional vanes may be formed by using the present invention, wherein an inner core is formed from a resin material so as to have a solid shape or a hollow shape including an internal cavity and a fiber-reinforced plastic layer is formed on inner and outer surfaces (outer surface, in this case) of the core portion. That is to say, the present invention can be applied to pressure resistance and/or vibration resistance parts in a rotary machine which generate a great amount of vibration and noise.

As mentioned above, according to the plastic part of the present invention, the following excellent advantages can be obtained:

(1) Since the fiber-reinforced plastic layer is formed on the inner and/or outer surfaces of the inner core, by changing the thickness of the inner core and/or the fiber-reinforced plastic layer, the coincidence frequency can be set appropriately. Thus, vibration and noise can be attenuated at a desired frequency, and a plastic part having desired strength and elastic modules which are greater than those of any part using a conventional vibration suppressing material can be provided.

(2) By using the fiber-reinforced plastic having elastic modules higher than that of the inner core as the fiber-reinforced plastic layer, the load acting on the inner core formed from low elastic modules resin can be reduced.

(3) Further, according to the manufacturing method of the present invention, the inner core is formed from a resin material by a photo-forming technique, a fiber-reinforced prepreg is adhered to an inner and/or outer surface of the inner core, the fiber-reinforced prepreg is closely contacted with the inner core by a vacuum pack technique, and then the resin is cured. Thus, a plastic part having a complicated three dimensional structure with the above advantages (1) and (2) can be formed easily.

What is claimed is:

1. A method for manufacturing a plastic product, comprising:

forming an inner core so as to have a three-dimensional solid shape or a hollow shape including an internal cavity, by a photo-forming technique;

adhering a fiber-reinforced prepreg onto an inner surface and/or an outer surface of said core;

closely contacting said fiber-reinforced prepreg with said inner core by vacuum packing said fiber-reinforced prepreg and said inner core within a bag; and curing said fiber-reinforced prepreg.

2. A method for manufacturing a plastic product according to claim 1, wherein said fiber-reinforced prepreg after curing has an elastic modules higher than that of said inner core.

3. A method for manufacturing a plastic product according to claim 1, wherein said fiber-reinforced prepreg is a carbon fiber mat impregnated with an epoxy resin, or a glass fiber mat impregnated with a thermosetting resin and maintained in a gel form.

4. A method for manufacturing a plastic product according to claim 1, wherein said plastic product is a component of a high speed and high pressure rotary machine.

5. A method for manufacturing a plastic part according to claim 4, wherein said component is a pump casing or an impeller.

6. A method for manufacturing a plastic product according to claim 2, wherein said plastic product is a component of a high speed and high pressure rotary machine.

7. A method for manufacturing a plastic product according to claim 3, wherein said plastic product is a component of a high speed and high pressure rotary machine.

8. A method for manufacturing a plastic part according to claim 6, wherein said component is a pump casing or an impeller.

9. A method for manufacturing a plastic part according to claim 7, wherein said component is a pump casing or an impeller.

* * * * *